United States Patent [19]

Nomura et al.

[11] Patent Number: 5,106,160
[45] Date of Patent: Apr. 21, 1992

[54] ARMREST HAVING INCLINATION ADJUSTING MECHANISM

[75] Inventors: Yukiharu Nomura; Susumu Hatta; Mitsuaki Owaki, all of Akishima, Japan

[73] Assignee: Tachi-S Co. Ltd., Tokyo, Japan

[21] Appl. No.: 635,944

[22] Filed: Dec. 28, 1990

[51] Int. Cl.⁵ ............................ A47C 7/54; B60N 3/02
[52] U.S. Cl. ...................................... 297/417; 297/115
[58] Field of Search ..................... 297/35, 36, 37, 40, 297/41, 113, 115, 116, 117, 161, 162, 173, 227, 359, 360, 417, 422

[56] References Cited

U.S. PATENT DOCUMENTS 3,807,799  4/1974  Freedman ................... 297/113 X
4,848,840  7/1989  Toya ............................. 297/417
4,946,226  8/1990  Hurn et al. ................... 297/417

FOREIGN PATENT DOCUMENTS 112332   9/1981  Japan ............................ 297/115
1256977 12/1971  United Kingdom ........ 297/417

Primary Examiner—Kenneth J. Dorner
Assistant Examiner—James M. Gardner
Attorney, Agent, or Firm—Oldham, Oldham & Wilson Co.

[57] ABSTRACT

An armrest of the type rotatable laterally of a seat back of a seat, wherein the armrest is rotatable between an upright non-use position and a horizontal use position, by virtue of a stopper plate having a first limit projection defining the non-use position and a second limit projection defining the use position, the stopper plate being fixed on a support rod on which is also rotatably mounted the armrest in such a manner that the stopper plate is disposed between the lateral wall of the seat back and the armrest body. Such stopper plate is engageable with a pin provided within the armrest.

5 Claims, 4 Drawing Sheets

ARMREST HAVING INCLINATION ADJUSTING MECHANISM

BACKGROUND OF THE INVENTION

1. Field of the Invention

The present invention relates to an armrest for integral use with an automotive seat, and particularly to an armrest of the type provided rotatably on the lateral wall of the seat back of the seat, which permits the armrest to be rotated between an upright non-use position and horizontal use position.

2. Description of Prior Art

FIG. 1 shows a conventional armrest of the type rotatable laterally of seat back of a seat. Reference characters (SB), (4) and (A') refer to a seat back, seat back frame, and armrest body, respectively.

The armrest body (A') is composed of a frame (F'), a foam padding (P') and a surface covering (S'). The frame (F') is covered with the padding (P'). The padding (P') is in turn affixed with the covering (S').

A support rod (1) is at its one end firmly supported by a bracket (5) integral with the seat back frame (4). Another end of the support rod (1) extends from the lateral wall of the seat back (SB) to penetrate through the base end part of the armrest body (A'). In other words, upon such free end of the rod (1), the armrest body (A') is supported rotatably.

Within the armrest body (A'), a stopper plate (3) is welded fast or spline connected to the foregoing another free end of the support rod (1). The stopper plate (3) is formed with an upper limit projection (3a), a lower limit projection (3b) and a arcuate edge part (3c) interposed between those two projections (3a)(3b). Further, within the armrest body (A), a pin (2) is fixed on the inner surface of the frame (F), such as to be in a sliding contact with the arcuate edge part (3c) of the stopper plate (3).

With the construction, the armrest (A') is rotatable within the range between the upper and lower limit projections (3a)(3b); namely, when rotating the armrest (A') upwardly to an upright non-use position, as in FIG. 1, the pin (2) is also moved slidingly along the arcuate edge part (3c) to contact the upper limit projection (3a), whereupon the projection (3a) limits the upward rotation of the armrest body (A) so as to place the armrest body (A') in a non-use position. Reversely, when rotating the armrest body (A') forwardly to a horizontal use position, the pin (2) is then moved slidingly along the arcuate part (3c) to contact the lower limit projection (3b), whereupon, by being limited by the projection (3b) against downward rotation, the armrest body (A') is set horizontally in a use position.

However, it has been found defective that, in assembling the armrest, to fix the stopper plate (3) on the rod (1) in the armrest body (A') requires troublesome steps for firstly mounting the armrest body (A') upon the rod (1) before fixing the stopper plate thereon, which means that the armrest body (A') is not used as it is but needs to be specially modified for allowing access of the stopper plate (3) thereinto. Consequently, the prior art structure of the armrest remains to leave a poor aspect in its assemblage.

SUMMARY OF THE INVENTION

In view of the above-stated drawbacks, it is a purpose of the present invention to provide an improved armrest which is easy to assemble.

In achieving the purpose, in accordance with the present invention, an armrest body is rotatably supported upon a support rod extending from the lateral wall of a seat back, and a stopper plate, which is for limiting rotation of the armrest between upright non-use and horizontal use positions, is fixed on the support rod, such that the stopper plate is interposed between the armrest and lateral wall of seat back.

Accordingly, the assemblage of the armrest is simplified, because a first step is for fixing the stopper plate adjacent to the lateral wall of seat back, and the a second step for mounting the armrest, which means no necessity to specially machine or process the armrest as in the prior art.

It is another purpose of the present invention to permit adjusting the armrest in height relative to the horizontal use position.

To this end, there is provided an armrest height adjusting mechanism which includes a serration part upon the stopper plate and a pin having an engagement part to be engaged into one selected valley of the serration part. The pin is manually moved into engagement with or disengagement from the valley, allowing its engagement with another valley. In that way, the armrest may be adjusted in height in regard to a horizontal use position.

DETAILED DESCRIPTION OF PREFERRED EMBODIMENT OF THE INVENTION

Figure 1:
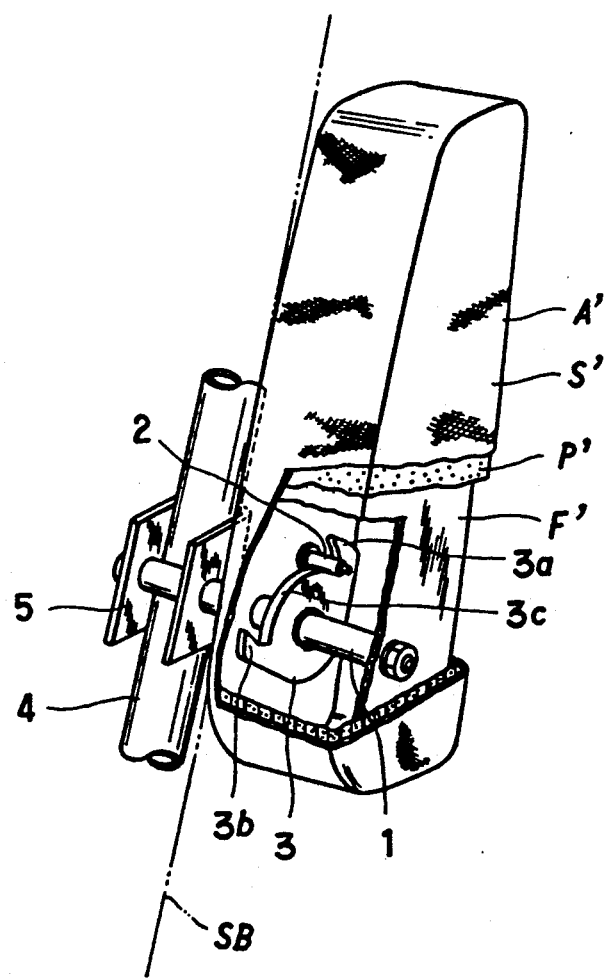
FIG. 1 is a partly broken perspective view of a conventional armrest.
Figure 2:
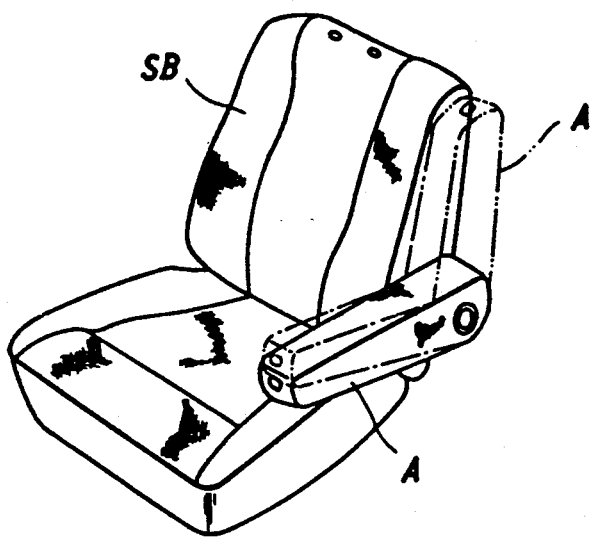
FIG. 2 is a perspective view of an automotive seat to which is mounted an armrest in accordance with the present invention.
Figure 3:
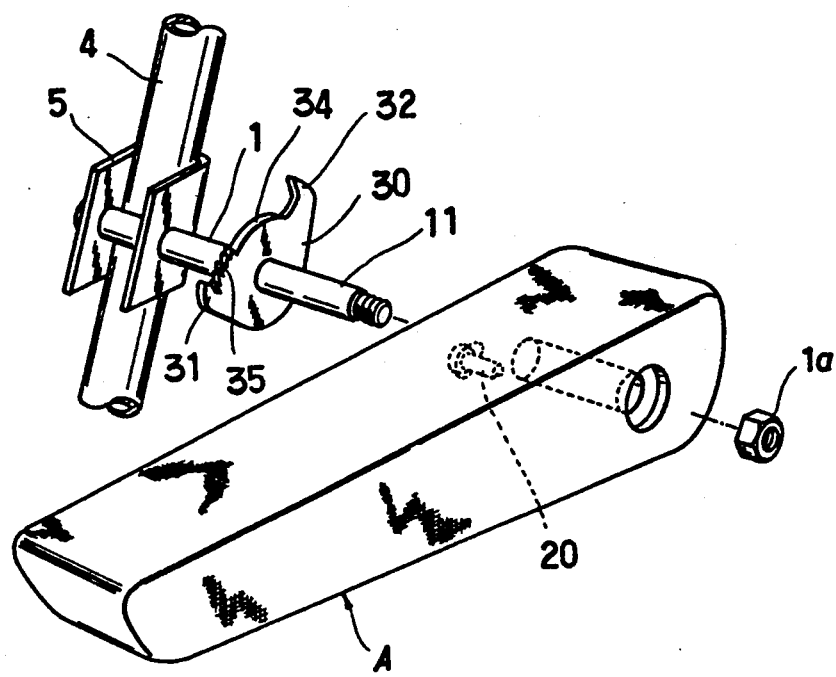
FIG. 3 is a partly exploded perspective view of the armrest, which explanatorily shows the state where the armrest is attached on a support rod extending from the lateral wall of a seat back.
Figure 5:
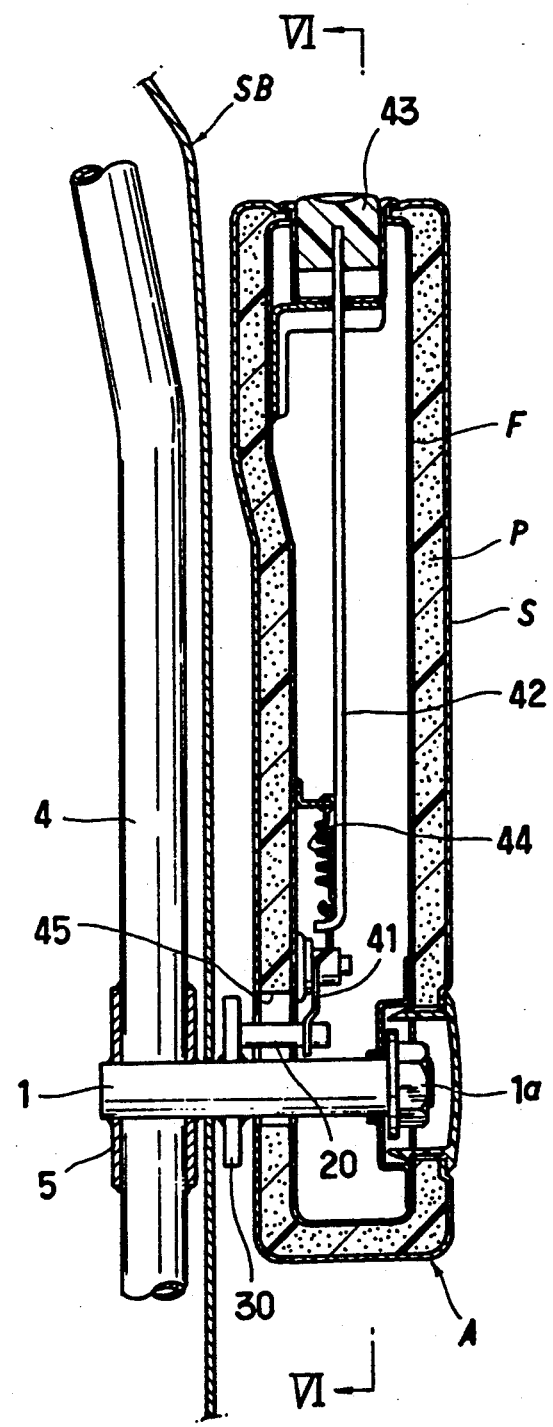
FIG. 5 is a longitudinally sectional view of the armrest, which shows the state where the armrest is mounted laterally of the seat back.

Referring to FIGS. 2 and 3, similarly to the above-stated prior art, an armrest (A), in accordance with the present invention, is provided laterally of the seat back (SB) such as to rotatable about the support rod (1) fixed by the bracket (5) integral with the seat back frame (4): Namely the armrest (A) is vertically rotatable between the horizontal use position indicated by the solid line and the upright non-use position indicated by the two-dot chain line in FIG. 2. Like the prior art, the armrest (A) is formed by a frame (F), a foam padding (P) and a surface covering (S), with the frame (F) being covered with the padding (P) and with the surface covering (S) covering the padding (P) in the order as shown in FIG. 5. Hence, upon the support rod (F) is rotatably supported, as shown.

As readily seen from FIG. 3, by contrast to the prior art, there is provided a stopper plate (30) outwardly of the armrest body (A), upon the exposed free end part of the rod (1). The stopper plate (30) is welded fast on the rod (1) at a point adjacent to the lateral wall of the seat back (SB), for the purpose of arranging the stopper plate (30) per se exteriorily of the armrest (A), and further defining on the remaining region of the rod (1) a armrest support region (11) on which is rotatably supported the armrest (A).

Otherwise stated, in conjunction with FIG. 5, it is to be seen that the stopper plate (30) is interposed between the lateral wall of the seat back (SB) and armrest (A), with those three elements (30)(SB)(A) being disposed in a coaxial relation with one another relative to the support rod (1), and that the armrest (A) is rotatably supported at the support region (11) in the rod (1).

The armrest (A) is retained by a bolt (1a) to the rod (1) against removal therefrom.

Accordingly, it is to be appreciated that, in a practical assemblage of the armrest (A) onto the seat back (SB), the first step is for welding the stopper plate (30) on the support rod (1) and the second step for attaching the armrest (A) on the support region (11) of the support rod (1), in a simple sequential order. This eliminates a troublesome step for machining or processing the armrest (A) specially for welding the stopper plate (1) to the support region of the rod (1) which is defined interiorily of the armrest (A) as in the prior art.

In accordance with the present invention, there is arranged an armrest angle adjustment mechanism in the above-described structure of armrest (A).

Figure 4:
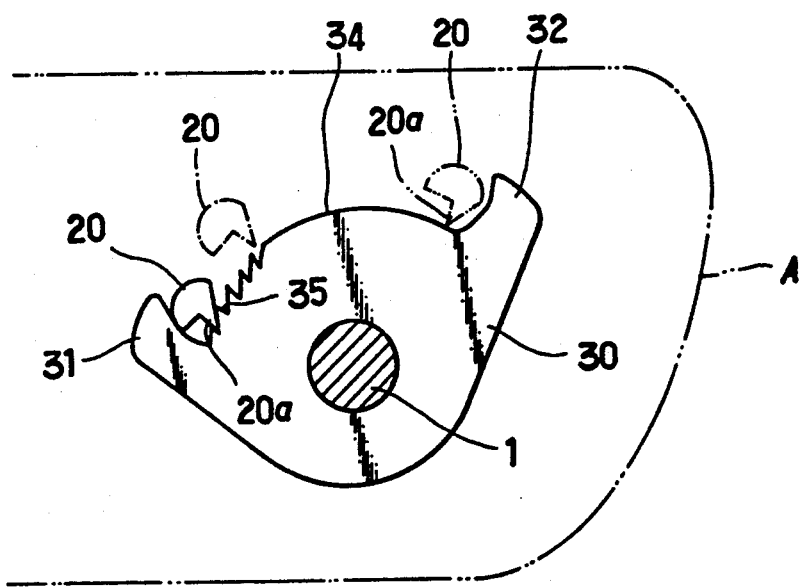
FIG. 4 is a front view of a stopper plate and a pin, showing explanatorily the engagement relation of the pin with the stopper plate.

Referring further to FIGS. 3, 4, 5 and 6, the stopper plate (30), which is basically similar to that (3) of the prior art in terms of having a lower limit projection (31) for limiting the forward rotation of the armrest (A) and an upper limit projection (32) for limiting the upward rotation of the same, is formed with serrated part (35) on the arcuate guide edge (34) at the point adjacent to the lower limit projection (31). As best shown in FIG. 4, the serrated part (35) lies on the arcuate guide edge (34) of the plate (30), continuing from the lower limit projection (31) to a certain point, for a purpose to be stated later as a part of the armrest angle adjustment mechanism.

Figure 6:
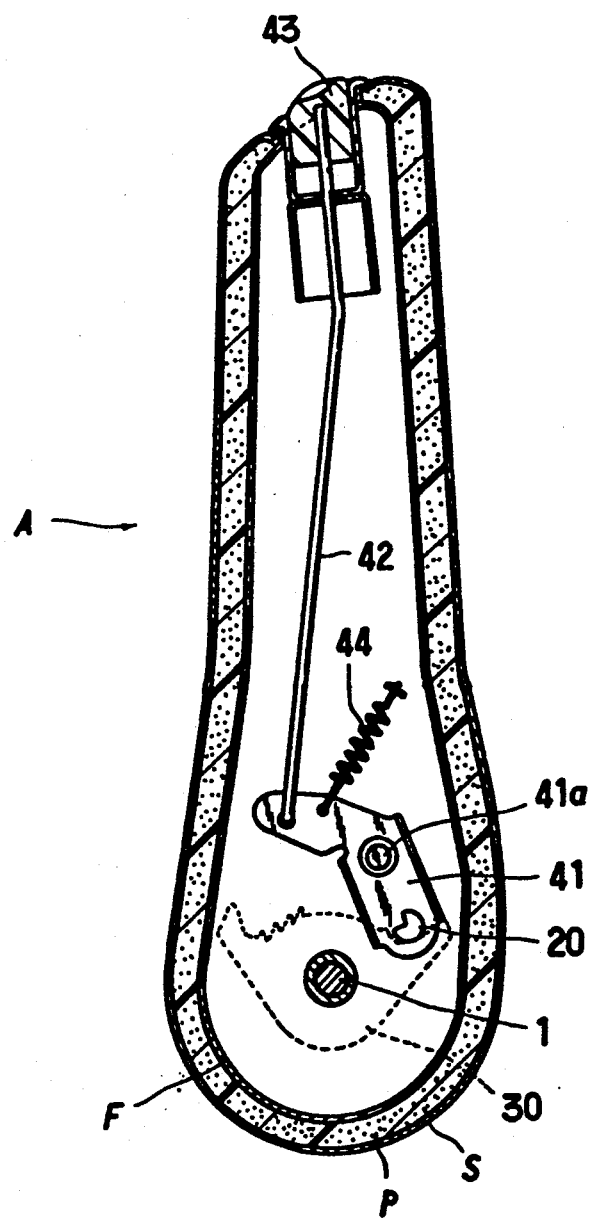
FIG. 6 is a sectional view taken along the line VI—VI in the FIG. 5.

As depicted in FIG. 6, in the vicinity of the foregoing stopper plate (30), a dog-leg shaped link (41) is pivotally provided on the inner surface of the frame (F) of the armrest (F) by means of a support pin (41a). Specifically, the link (41) is at its center supported rotatably by the pin (41a) in a manner to be rotatable freely about the pin (41a), with such an arrangement that, at one end part of the link (41) which extends toward the stopper plate (30), is fixed a guide pin (20) having a tooth-like engagement part (20a), whereas, to the other end part of the link (41), is secured one free end of connecting rod (42).

As can be seen from FIGS. 3 and 5, the guide pin (20) extends from the stopper plate (30) through an elongated hole (45) formed in the lateral wall of the armrest, wherein that lateral wall is on the side facing that of the seat back (SB), and terminates in the free end part to be contact with the stopper plate (30).

The connecting rod (42) extends from the aforesaid other end of the link (41) along the longitudinal direction of the armrest (A) towards the forward end of the armrest (A), and terminates in the end provided with a push button (43) which is slidably fitted in a hole at the forward end of the armrest (A).

The dogleg link (41) is elastically urged by a spring (44) to rotate in a clockwise direction, thereby normally keeping the guide pin (20) in contact with the arcuate guide edge (34) of the stopper plate (30), or rather to state precisely, as shown in FIG. 4, the engagement part (20a) of the guide pin (20) is normally biased into a sliding contact upon the guide edge (34). The spring (44) is therefore at its one end connected to the link (41) and at its other end secured to the inner surface of the armrest frame (F). Hence, the push button (43) is so urged by the spring (44) as to normally project its outer surface at the forward end of the armrest (A). With such construction, when the armrest (A) is set uprightly at the non-use position as in FIG. 6, the guide pin (20) is contacted with the upper limit projection (32) of the support plate (30) as seen by the two-dot chain line in FIG. 4. Then, if it is desired to rotate the armrest (A) towards the use position as indicated by the solid line in FIG. 2, an occupant on the seat has only to push forwardly the armrest (A) until the guide pin (20) reaches the first valley of the serrated part (35) of the stopper plate. At such process, during the rotation of the armrest (A) down to the non-use position, the guide pin (20) is moved slidingly along the arcuate guide edge (34) of the plate (30), whereby a certain friction between the guide pin (30) and guide edge (34) serves to make slow the rotative motion of the armrest (A), thus avoiding an initial sudden quick rotation of the armrest (A).

When the engagement part (20a) of the guide pin (20) reaches and is engaged into the first valley of the serrated part (35) as understandable from the one-dot chain line in FIG. 4, the armrest (A) is placed in a first locked state, thereby setting a most upward inclined level of the armrest (A). Now, depressing the push button (43) causes counterclockwise rotation of the link (41) against the biasing force of the spring (44) to bring the guide pin (20) away from the serrated part (35) of the stopper plate (30), whereupon the armrest (A) is in an unlocked state, allowing its free rotation and adjustment of the inclination angle of the armrest with respect to the horizontal non-use position.

To adjust the armrest inclination angle, the occupant rotates the armrest (A), keeping to depressing the push button (43), to set a desired inclination angle (or height) of the armrest (A), and then releases the push button (43) to bring the engagement part (20a) of the guide pin (20) into engagement with one of valleys of the serrated part (35) of the guide plate (30). Thus, as can be seen from the one-dot chain line in FIG. 2, the armrest (A) can be adjusted at a desired height within its non-use position.

What is claimed is:

1. An armrest, comprising:
    a support rod fixed on a lateral surface of a seat back of a seat to which is applied said armrest, on which support rod is supported said arm rotatably such as to permit free rotation of said armrest about said support rod;
    a stopper means provided fixedly upon said support rod, such that said stopper means is disposed exteriorly of said armrest, said stopper means being for limiting a range within which said armrest is rotated between use and non-use positions in relation to a lateral wall of said seat back;

an armrest inclination adjusting mechanism for adjustment of a inclination of said armrest within said use position, said mechanism including:
(a) a plurality of serrations formed on said stopper means, said serrations being disposed in the rotatable range of said armrest;
(b) an operation means provided at a forward end portion of said armrest; and
(c) a pin means which is provided interiorly of said armrest, extending through an elongated hole in said armrest and terminating thus in an end portion disposed outside of said armrest for an engageable relation with said serrations formed on said stopper means; and
(d) a link means for operatively interconnecting said pin means extending through said elongated hole, and terminating means and said operation means, said link means being disposed within said armrest;
whereby operating said operation means actuates said link means to cause engagement and disengagement of said pin means with and from one selected valley of said serrations, thereby permitting said armrest to be adjustably displaced in inclination relative to said use position.

2. The armrest according to claim 1, wherein said stopper means comprises a stopper plate which is formed with a first and second limit projections, wherein said plural serrations are formed between said first and second limit projections, wherein said first limit projection is adapted for limiting a downward rotation of said armrest so as to set said armrest horizontally at said use position, thereby defining a horizontal use position, and wherein said second limit projection is adapted for limiting an upward rotation of said armrest so as to set said armrest uprightly at said non-use position, thereby defining an upright non-use position.

3. The armrest according to claim 1, wherein said pin means comprises a pin having a engagement part to be engaged into said one selected valley of serration.

4. The armrest according to claim 1, wherein said operation means of said armrest inclination adjusting mechanism comprises a push button fitted slidably at said forward end of said armrest, wherein said link means of said armrest inclination adjusting mechanism comprises a wire link whose one end is connected to said push button, and a dog-leg-like link having one end connected to another end of said wire link and having another end connected to said pin means, said dog-leg-like link being pivoted rotatably within said armrest, and wherein said armrest inclination adjusting mechanism includes a spring for urging said dog-leg-like link to rotate in a direction causing said push button to project at said forward end of said armrest and simultaneously bringing said pin means into engagement with said one selected valley of said serrations formed on said stopper means, whereby said pin means may be selectively engaged into a desired one of valleys of said serrations to thereby adjust a inclination of said armrest relative to said use position.

5. An armrest, comprising:
a support rod fixed on a lateral surface of a seat back of a seat to which is applied said armrest, said support rod being for supporting said armrest, permitting free rotation of said armrest about said support rod;
a stopper means provided fixedly upon said support rod, such that said stopper means is disposed for limiting a range within which said armrest is rotated between use and non-use positions in regard to a lateral wall of said seat back;
a pin means for engagement with said stopper means, said pin means being provided interiorly of said armrest and extending through an elongated hole formed in said armrest, terminating thus in an end portion which is disposed exteriorly of said armrest and to be in an engagement with said stopper; and
an armrest inclination adjusting mechanism for adjustment of a inclination of said armrest within said use position, said mechanism including a serration means defined in said stopper means and an operation means for causing engagement and disengagement of said pin means with and from one selected valley of said serration to thereby permit said armrest to be adjustably displaced in inclination relative to said use position,
wherein said operation means of said armrest inclination adjusting mechanism comprises a push button fitted slidably at a forward end of said armrest, a link whose one end is connected with said push button and whose another end is provided with said pin means, and a spring for urging said link to rotate in a direction causing said push button to project at said forward end of said armrest and simultaneously bringing said pin means into engagement with said one selected valley of said serration means, whereby depressing said push button causes disengagement of said pin means from said valley of serration means, permitting selective engagement of said pin means into a desired one of valleys of said serration means, to thereby adjust an inclination of said armrest relative to said use position.

* * * * *